United States Patent [19]

Kunz et al.

[11] 3,973,789

[45] Aug. 10, 1976

[54] COUPLING STRUCTURE

[75] Inventors: Robert H. Kunz, Upland; Gary L. Davis, La Puente, both of Calif.

[73] Assignee: Chromalloy American Corporation, City of Industry, Calif.

[22] Filed: Apr. 25, 1975

[21] Appl. No.: 571,739

[52] U.S. Cl. .................................... 285/39; 16/2; 285/47; 285/196; 403/243; 403/259
[51] Int. Cl.² ...................... F16L 5/02; F16L 59/12
[58] Field of Search ............ 285/196, 338, 162, 39, 285/208, 209, 47; 403/243, 259, 249, 248; 16/2; 248/56

[56] References Cited
UNITED STATES PATENTS

| | | | |
|---|---|---|---|
| 621,108 | 3/1899 | Leonard | 285/39 X |
| 706,265 | 8/1902 | Smalley | 403/259 |
| 3,841,667 | 10/1974 | Sands | 285/39 |
| 3,879,065 | 4/1975 | Kobayashi | 285/338 X |

FOREIGN PATENTS OR APPLICATIONS

| | | | |
|---|---|---|---|
| 115,310 | 12/1917 | United Kingdom | 285/196 |
| 533,966 | 2/1941 | United Kingdom | 285/39 |

*Primary Examiner*—Thomas F. Callaghan
*Attorney, Agent, or Firm*—Edward D. O'Brian

[57] ABSTRACT

An effective, easily installed coupling structure for use in securing a pipe in an opening in a member from one side of the member can be constructed so as to utilize an expandable sleeve. Such a sleeve is initially of a cylindrical configuration and is located around a threaded end of the pipe adjacent to a tapered shoulder on the pipe. The pipe is inserted through such an opening so that the sleeve extends through the opening and so that a flange on the sleeve abuts against the member. A nut is then located around the threaded end and relative rotation is caused between the nut and the pipe through the use of a holding structure on the pipe and the nut. Such action holds the sleeve as the pipe is drawn toward the member. Engagement between the sleeve and the shoulder then expands the sleeve so that the pipe is held as the result of the flange engaging one side of the member and the sleeve engaging the other side of the member.

1 Claim, 4 Drawing Figures

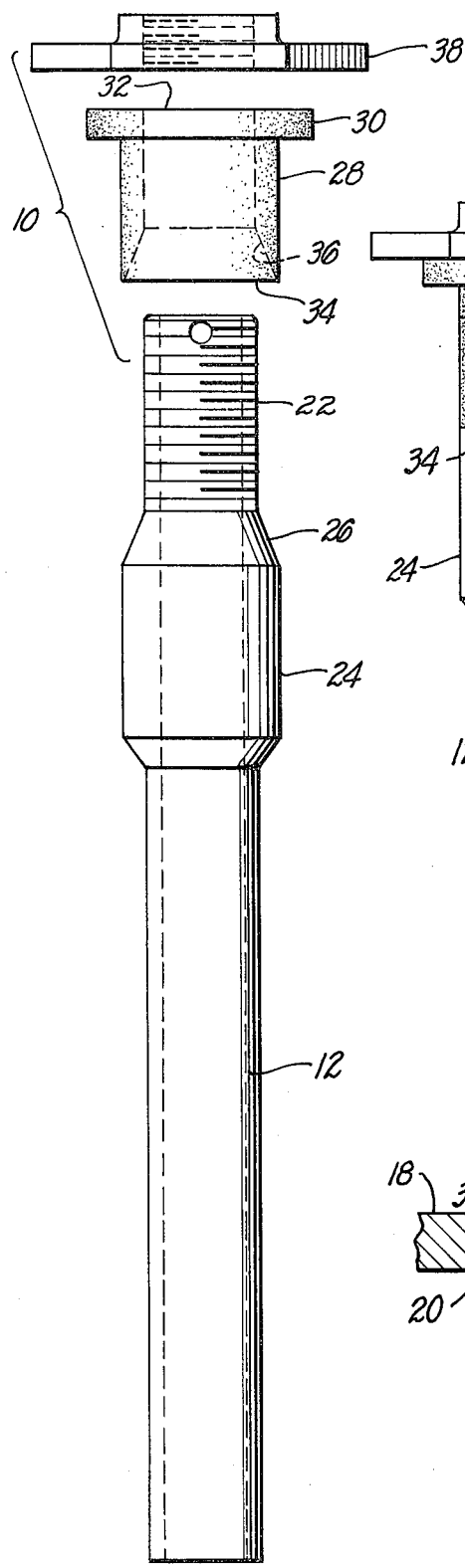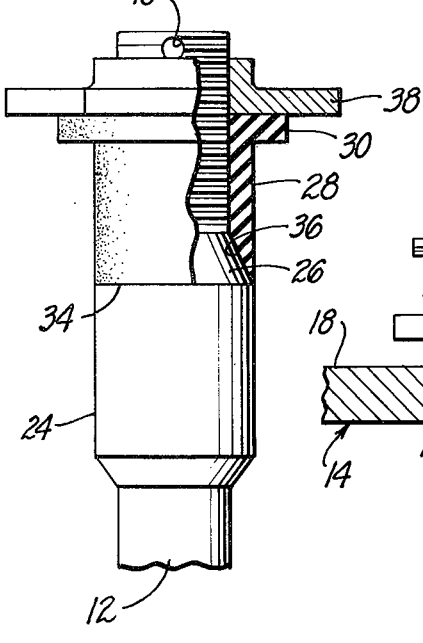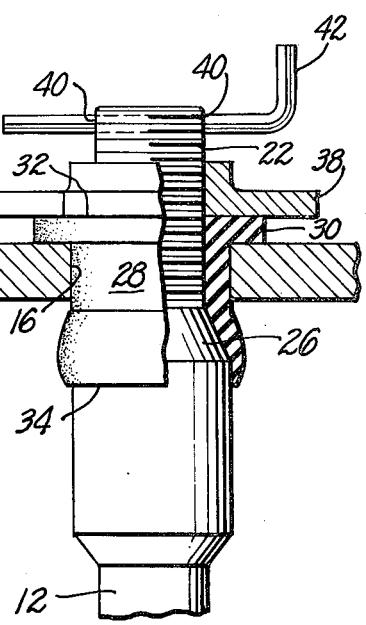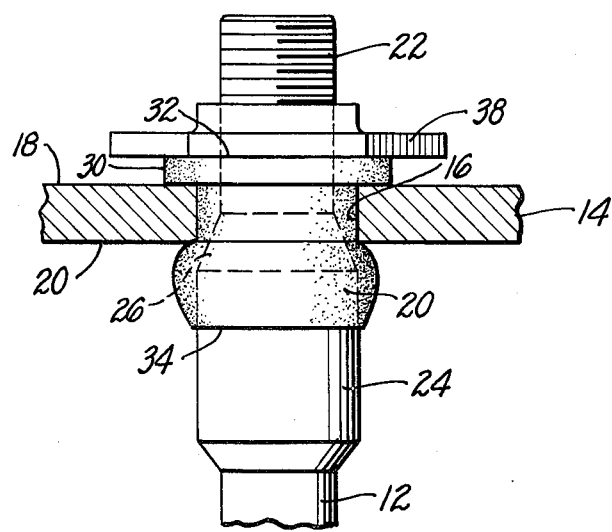

COUPLING STRUCTURE

BACKGROUND OF THE INVENTION

The invention set forth in this specification pertains to a new and improved coupling structure for use in securing a pipe in an opening in a member from one side of the member.

A variety of different pipe connectors and/or couplings have been developed for securing pipes in place from one side of a member. Such structures are all considered to have a degree of relative merit. It is not believed that an understanding of the present invention requires a detailed consideration and analysis of such prior structures. It is considered that all of such prior structures are somewhat disadvantageous or undesirable for one or more reasons. It is also considered that it is unnecessary to set forth a detailed consideration of such reasons since an understanding of them is unnecessary to an understanding of the invention set forth in this specification.

In general terms any coupling structure for a utilization as indicated must be comparatively simple. Further, such a structure must be comparatively inexpensive to manufacture. Also such a structure must be capable of being installed with a minimum of labor and with a minimum of difficulty. Of course the acceptability of any such structure is also contingent upon such a structure being capable of satisfactorily serving to secure a pipe in place for a prolonged period.

BRIEF SUMMARY OF THE INVENTION

An objective of the present invention is to provide new and improved coupling structures for use in securing a pipe in an opening in a member from one side of the member. Further objectives of the invention are to provide coupling structures as described which are comparatively simple, which use a limited number of parts, which are comparatively inexpensive to manufacture and to install, which may be installed with a minimum of labor and difficulty, and which are capable of prolonged, reliable performance. A further objective of the invention is to provide a coupling structure as described which can be utilized so as to block galvanic action.

In accordance with this invention these and various related objectives of it as will be apparent from the remainder of this specification are achieved by providing a coupling structure for use in securing a pipe to a mounting member which has an opening located therein, which structure comprises: a pipe having a threaded end, a tapered shoulder located concentrically around the pipe adjacent to the end, this shoulder diverging away from the end, and means for holding the pipe; an elastomeric sleeve fitting around the end adjacent to the shoulder, this sleeve having an outwardly extending flange located on its extremity away from the shoulder; and a nut means threaded on the end of the pipe so as to be capable of engaging the flange.

A structure of this type can be used from one side of the mounting member by the insertion of a pipe through the opening so that the flange on the sleeve fits against one side of the member and so that the pipe extends from the other side of the member. When the pipe is so inserted the nut and the holding means may be engaged by appropriate tools so as to either rotate the pipe and/or the nut in such a manner as to cause movement of the nut toward the shoulder. Such movement will hold the flange on the sleeve against the member as the pipe is drawn into engagement with the sleeve. Such engagement will also cause expansion of the sleeve on the other side of the member to a sufficient extent so that the pipe will be clamped or held relative to the member.

BRIEF DESCRIPTION OF THE DRAWING

The invention is best more fully explained with reference to the accompanying drawing in which:

FIG. 1 is an exploded view showing the parts of the coupling structure of this invention in elevation;

FIG. 2 is an elevational view, partially in section, showing the coupling structure of this invention assembled so as to be capable of being installed;

FIG. 3 is an elevational view, partially in section, illustrating the installation of the coupling structure of this invention in an opening in a member, this member being shown in cross-section; and FIG. 4 is an elevation view corresponding to FIG. 3 showing the coupling structure of this invention installed in a member, this member being shown in cross-section.

The precise coupling structure illustrated in the drawing is a presently preferred embodiment or form of a coupling structure in accordance with the invention. This coupling structure utilizes certain concepts or features as are set forth and defined in the appended claims. Through the use or exercise of routine mechanical engineering skill it is considered that anyone skilled in the field of pipe couplings can easily utilize these concepts and features in a variety of somewhat differently appearing and differently constructed coupling structures.

DETAILED DESCRIPTION

In the drawing there is shown a coupling structure 10 of the present invention which is intended to be utilized in securing a pipe 12 to a member 14 so that the pipe 12 extends through an opening 16 in the member 14. As far as the present invention is concerned the precise nature or utilization of the member 14 is immaterial. This member 14 will, however, normally form a part of a larger piece of equipment (not shown). The structure 10 is specifically designed so that it may be utilized when a surface 18 of the member 14 is exposed and when the opposed surface 20 of the member 14 is inaccessible. Normally the member 14 will be a metal plate or the like.

The structure 10 includes a threaded end 22 on the pipe 12 and a cylindrical enlargement 24 of slightly less diameter than the opening 16 located around and preferably forming a part of the pipe 12. This enlargement 24 may be integrally formed as a part of the pipe 12 or it may consist of a sleeve which is secured to the pipe 12 in a conventional manner such as, for example, by welding, through the use of an adhesive, or the like. This enlargement 24 includes a tapered shoulder 26 which is located adjacent to the end 22. This shoulder 26 gradually diverges away from the end 22 and is a conical structure extending completely around the exterior of the pipe 12.

The coupling structure 10 also includes an elongated cylindrical sleeve 28 of slightly less diameter than the opening 16 and preferably of the same diameter as the enlargement 24. An outwardly extending peripheral flange 30 forms an integral part of this sleeve 28 at one of its ends 32. The other end 34 of the sleeve 28 is preferably provided with an internal conical taper 36 matching the taper on the shoulder 26. The sleeve 28 is preferably formed out of an electrically non-conductive polymer material capable of deforming as hereinafter described.

It is considered that the sleeve 28 should be formed of a polymer composition which is either elastomeric or somewhat elastomeric in character for the structure 10 to be capable of being installed as hereinafter indicated. Obviously the material used to form the sleeve 28 should be chosen with reference to any particular application of the coupling structure 10 so that the sleeve 28 will not significantly deteriorate during the use of the structure 10. Since many polymeric elastomers are well known it is not considered necessary to discuss suitable materials in this specification.

The structure 10 also includes an enlarged nut 38 which is adapted to be threaded upon the end 22. If desired a conventional washer (not shown) can be utilized in conjunction with the nut 38. The structure 10 also includes aligned holes 40 which are exposed when the sleeve 28 and the nut 38 are assembled on the pipe 12 as indicated in FIG. 2. These holes 40 may be referred to as "holding means" since they are intended to be utilized with an Allen wrench 42 or similar spanner tool as hereinafter indicated. Various other equivalent holding means such as notches, an internal socket or the like (not shown) can be used instead of the holes 40.

In being installed the coupling structure 10 will be inserted through the opening 16 at the surface 18 until such time as the flange 30 abuts against the surface 18. At this point the nut 38 wll be engaged by an appropriate tool (not shown) and the wrench 42 will be inserted through the holes 40. At this point either the nut 38 may be turned while the wrench 42 is held in one position or the wrench 42 may be turned while the nut 38 is held steady or both the wrench 42 and the nut 38 may be concurrently actuated so as to draw the pipe 12 generally toward the member 14. Because of the character of the material used within a suitable sleeve 28 it is, however, preferred to hold the nut 38 against motion while turning the wrench 42. This is considered to avoid the possibility of undue stresses and strains being set up within the sleeve 28 as the result of frictional considerations.

As the pipe 12 is pulled generally toward the member 14 the shoulder 26 will be brought into contact with the taper 36. This will tend to expand the sleeve 28 outwardly until the sleeve 28 engages the surface 20 of the member 14. As there is further expansion of the sleeve 28 the sleeve 28 will tend to be pinched in as indicated in FIG. 4 until such time as the pipe 12 is firmly held with respect to the member 14. At this point the coupling structure 10 is completely installed and is ready to be used. Frequently such use will involve the threading of an appropriate member such as a strainer, another pipe or the like (not shown) upon the end 22. It is noted that because of the material within the sleeve 28 that the pipe 12 will be electrically insulated from the member 14 as the coupling structure 10 is used. In some applications this will be significant in preventing galvanic corrosion.

We claim:
1. A coupling structure for use in securing a pipe to a mounting member which has an opening located therein, said structure consisting essentially of:
   a pipe having a threaded end, a tapered, conical shoulder located concentrically around said pipe adjacent to said end, said shoulder diverging away from said end a cylindrical enlargement adjacent said shoulder and means for engaging said end of said pipe by a spanner tool,
   an elastomeric sleeve fitting around said end adjacent to said shoulder, said sleeve having an outwardly extending flange located on its extremity remote from said shoulder and having an internal taper within the end thereof remote from said flange, said taper fitting against said shoulder, said sleeve having an external diameter substantially equal to the external diameter of said enlargement, said diameters being slightly less than the diameter of the opening in said member and
   nut means threaded on said end and engaging said flange,
   said pipe and said sleeve being capable of being inserted through said opening from one side of said member so that said flange fits against said side of said member and so that said pipe extends from the other side of said member,
   when so inserted said pipe being capable of being manipulated as the result of engagement of said nut and said engaging means so as to cause movement of said nut toward said shoulder, such movement causing movement of said sleeve into engagement with said shoulder, such engagement causing expansion of said sleeve to a sufficient extent for said sleeve to engage said other side of said member and also to engage a portion of the external surface of said enlargement so as to hold said pipe against linear movement relative to said member.

* * * * *